United States Patent Office 3,322,519
Patented May 30, 1967

3,322,519
ANTISTATIC ADDITIVES
Eric O. Forster, Scotch Plains, N.J., assignor to Esso Research and Engineering Company, a corporation of Delaware
No Drawing. Filed June 24, 1963, Ser. No. 290,192
7 Claims. (Cl. 44—56)

This invention relates to the use of additives to improve the electrical properties of combustible organic liquids. In particular, this invention relates to the incorporation of selected bifunctional compounds in jet fuels, gasolines, kerosenes, heating oils, naphtha solvents and similar organic combustible liquids boiling in the range between about 75° F. and about 750° F. in order to improve the electrical conductivity of these liquids. Intended for use in the present invention are such bifunctional compounds as diamines, hydroxy nitriles, hydroxy amines, hydroxy halogenides, dihalogenides, halo-cyanides, amino-cyanides and amino-halogenides.

In recent years numerous explosions have occurred during the transportation and handling of hydrocarbon fuels, dry cleaning solvents and similar combustibles boiling in the range between about 75° F. and about 750° F. There is mounting evidence to the effect that these explosions have in many cases been caused by static electricity. Such an explosion requires both a flammable air-hydrocarbon vapor mixture and a spark discharge of sufficient intensity to cause ignition. Jet fuels, kerosene, and certain hydrocarbon solvents are particularly hazardous in this respect because their vapors form readily explosive mixtures with air over a relatively wide temperature range and hence any electrical discharge which occurs is likely to cause an explosion.

That static discharges of electricity can cause explosions and fires is well recognized and has led the oil industry to adopt strict control measures in pumping and handling certain petroleum products. Studies have shown that electrical charges sufficient to ignite vapor-air mixtures may be generated during the handling of a wide variety of combustible organic materials. In laboratory experiments, for example, it has been demonstrated that high voltage electrical discharges can be readily created during the pumping or other frictional movement of combustible hydrocarbon liquids, particularly petroleum distillate fuels.

The production of static electricity in combustible organic liquids is associated with the presence of ionic or colloidal impurities which are capable of undergoing charge separation when flowing past a charge separating medium. The impurities may be present in the organic liquid or they may be derived from the surfaces over which the organic liquid flows. Complicating the static problem is the growing requirement for extremely clean and dry fuels for modern jet airliners. Since static generation is primarily a surface phenomenon, and micronic filters present large surface areas to fuel, high charge separation rates result. Flow through filters and filter separators therefore causes charge densities and currents much higher than obtained from flow in pipes. The cleaned-up fuels are sometimes so low in conductivity that static charge can build up to high levels.

There are other means by which charge separation can occur. Charged droplets can be formed by overhead splash filling, by turbulent loading, or by gas bubbling through the liquid. However, indications are that the hazards from these phenomena can be controlled by the proper use of procedures and equipment already available.

The most promising solution to the potentially hazardous situation of static charge generation is the use of an additive to increase the conductivity of the combustible organic liquid. The time it takes a quantity of charge to relax through the fuel to the vessel wall, whether the vessel is grounded or not, depends primarily on fuel conductivity. Increasing the conductivity correspondingly increases the rate at which charges are naturally dissipated. In general, it has been found that fuels having specific electrical conductivities in the range of about from $1\times10^{-14}$ to $1\times10^{-15}$ mhos per centimeter are particularly hazardous and that the danger in handling such liquids can be materially reduced by increasing their conductivities to values greater than about $1\times10^{-13}$ mhos/cm. This conclusion was reached after a thorough review of the data supplied by 37 airports around the world. At $10^{-13}$ mhos/cm., a fuel has a conductivity higher than all but 10% of fuels now being used throughout the world. Considering that there have been no static explosions in any commercial aircraft, this should provide an adequate margin of safety.

The prior art has suggested various compounds for increasing the specific conductivity of hydrocarbon fuels and similar combustible materials. In particular, it has been proposed to utilize soaps of polyvalent metals and combinations of such soaps with other materials. However, such additives have been found to be of little value because they readily form micelles and therefore become inactivated by the small quantities of water with which the liquids come into contact. They have also been found to adversely affect such properties of the combustibles as thermal stability. In addition, their effectiveness depends to a large extent on their ability to ionize, and organic soaps do not ionize to any appreciable degree. Moreover, these organic soaps may contribute to the static problem because their ionic components may be preferentially adsorbed on container walls, surfaces, etc. Since it is impossible to predict which charge, positive or negative, will predominate in the combustible liquid, there exists the possibility that these organic soaps might well aid electric charge generation and thus hinder charge dissipation.

The present invention provides a new and improved class of additive agents which greatly improve the electrical properties of combustible organic liquids boiling in the range between about 75° F. and about 750° F. It has now been found that bifunctional compounds such as diamines, hydroxy nitriles, hydroxy amines, hydroxy halogenides, dihalogenides, halo-cyanides, amino-cyanides and amino-halogenides improve the conductivity of organic combustible liquids boiling in the range between about 75° F. and 750° F. and thus reduce the danger of explosion due to the generation, accumulation and discharge of electrical energy.

The selection of a bifunctional compound for use as an antistatic additive is based upon the concept of "Zwitter-ion" formation. Impurities in an organic media are normally present in the form of ion pairs. One part of this ion pair may be adsorbed on the wall of the containing system while the other continues downstream. Although no detailed theoretical evidence is as yet available, the effectiveness of the invention is believed to be attributable to the ability of a bifunctional compound to replace the adsorbed part of the ion pair by neutralizing the remaining part of the ion pair and hence reduce the charging tendency of the organic media. In addition, a bifunctional compound is envisaged as allowing charges to reunite more easily and thus to retard their initial separation and subsequent selective adsorption on the walls of storage containers and/or liquid surfaces. Furthermore, it has been discovered that the bifunctional compounds of the present invention are less surface active than the conventionally used esters and would not be as readily lost during flow through pipes or in storage vessels.

Bifunctional compounds which are employed in accordance with the invention are of the following general formulae:

(1) 

(2) 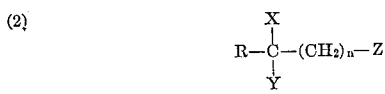

(3) 

where X and Z are selected from the class consisting of the following members: amino, cyano, hydroxy, chlorine and bromine. X and Z should be different except when either X or Z is an amino group, in which case the other member may also be an amino group, i.e., the compound may be a diamine. Good results are obtained with diamines for the reason that the nitrogen atom of the amino group easily gains or loses a proton. The amino group can therefore be either electrically positive or negative.

R is an alkyl radical of from 1 to 3 carbon atoms, Y is a hydrogen atom or is omitted entirely to introduce a double bond at this position. $R_c$ stands for a cyclic structure containing 4 to 8 atoms selected from the group consisting of carbon and nitrogen and wherein the number of nitrogen atoms does not exceed two. A preferred cyclic structure contains 4 to 6 carbon atoms and 2 to 0 nitrogen atoms. The structure of Formula 3 may contain one or more double bonds. When all the atoms in $R_c$ are carbon, V and W have the same meaning as X and Z. However, if V and W are affixed to nitrogen atoms, they represent hydrogen. $n$, in Formula 1, is a number from 1 to 8, with a preferred range of 2 to 5. In Formula 2, $n$ is a number from 0 to 7 with a preferred range of 0 to 3. In general, small molecules are preferred because of their greater solubility and resistance to micell formation.

Most of the compounds following the above generic descriptions are commercially available. Those not readily available can be synthesized according to well established procedures familiar to those skilled in the art. Specific compounds falling within Formula 1 which are particularly suitable for use as antistatic additives in the present invention include: ethylene diamine; 2-bromoethanol; 2-chloroethanol; 2-aminoethanol; 1-bromo-2-chloroethane; 3-chloro-1-propanol; 3-chloro-propionitrile; 4-chloro-1-butanol; 4-bromo-butyronitrile and 4-chloro-butyronitrile. Examples of compounds falling within Formula 2 include: lactonitrile; 1-chloro-2-propanol; 1-bromo-2-propanol; 1-amino-2-propanol; 2-chloro-1-propanol and 2-amino-1-butanol. Suitable bifunctional compounds falling within Formula 3 include: piperazine; o,p-cyanophenol; o,m,p - chlorophenol; o,m,p - bromophenol; o,m,p-aminophenol; p-OH-benzonitrile; p-aminobenzonitrile; p-amino phenethyl alcohol; o,m,p-chloroaniline; 2-amino pyrimidine; 1-OH-cyclohexanecarbonitrile and 1,4-cyclohexane dicarbonitrile.

The bifunctional compounds described above are, in accordance with the present invention, incorporated into combustible organic liquids boiling in the range of about 75° F. and about 750° F. in minor amounts, i.e., in concentrations ranging between 10 and 800 p.p.m., and preferably in the range of 50 to 500 p.p.m.

The combustible organic liquids within which the additives of the present invention may be advantageously employed are the petroleum distillate fuels boiling in the range between about 75° F. and about 750° F and include hexane, heptane, toluene, petroleum naphtha, xylene, gasoline, aviation turbo-jet fuel, kerosene, diesel fuel and similar fuels. Gasolines which may be benefited by the presence of the additives include both motor gasolines and aviation gasolines such as those defined by ASTM specifications D-910-56 and D-439-56T. Aviation turbo-jet fuels in which the additives of the invention are particularly useful are described at length in U.S. Military Specifications MIL-F-5616, MIL-F-5624D, MIL-F-25558A and MIL-F-25524A. Diesel fuels as referred to in connection with the invention are defined in ASTM specification D-975-53T.

If desired, the additive agents of the invention may be incorporated into petroleum distillate fuels in the form of an additive concentrate containing the bifunctional compound in combination with other additives conventionally used in such fuels. Such conventional additives include rust inhibitors, dyes, dye stabilizers, anti-oxidants, and the like. A volatile inert organic solvent such as benzene, xylene, toluene, diethylene glycol, pyridine or the like may be used as the vehicle in such a concentrate.

The exact nature and objects of the invention may be more fully understood by reference to the following examples:

Example 1

The bifunctional compounds to be tested were added in various concentrations to samples of aviation turbo-jet fuel. 60 ml. of each test solution were placed in the glass container of a conductance cell. The cell was then immersed in the solution and tests carried out to determine the effectiveness of the additives for increasing the specific conductivity of the fuel. The fuel employed in carrying out these tests was representative of the aviation turbo-jet fuels classified as JP-4 fuel and defined by U.S. Military Specification MIL-F-5624D. It had an API gravity of 48.7°, a Reid vapor pressure of about 2.5 pounds per square inch and a boiling range between about 100° F. and about 500° F.

The tests were carried out using an electric measuring conductance cell, model 100 T3, manufactured by the Balsbaugh Laboratories, Marshfield Hills, Mass., a Heathkit DC power supply (Heathkit Division of Daystrom) and a Keithley 610A electrometer (Keithley Instrument Inc.). The specific conductivity, $\sigma$, was obtained from the measurement of the current, I, flowing through the test assembly when V volts were applied. $\sigma$ is computed from the standard formula $$\sigma = \frac{I}{V} \cdot K$$

where K is the cell constant. All measurements were carried out with an applied voltage of 100 volts. Current readings were begun 5 seconds after the voltage was applied. Since the current decreases rapidly in the first few minutes, at least 5 minutes were allowed to pass in order to obtain a steady reproducible reading. The reported results are based on these lower current readings whereas conductivity values previously reported in the literature refer in most cases to high readings made 5 seconds after voltage application. The specific conductivity values reported here are therefore more reliable than those taken after 5 seconds for the reason that they are taken under more severe conditions.

The results of the tests for the base fuel and for samples of the base fuel containing several concentrations of the various additives are shown below in Table I.

TABLE I.—EFFECT OF ADDITIVES UPON CONDUCTIVITY

| Run | Bifunctional Compound | Base Fuel | Specific Conductivity mho/cm.—Concentration, Wt. percent | | | | |
|---|---|---|---|---|---|---|---|
| | | | 0 | 0.001 | 0.01 | 0.1 | 1.0 |
| 1 | Lactonitrile | Regular Hydrofined JP-4 | $1.5 \times 10^{-14}$ | $1.3 \times 10^{-10}$ | $1.2 \times 10^{-9}$ | $1.6 \times 10^{-9}$ | |
| 2 | Ethylene Diamine | Clay treated JP-4 | $2.6 \times 10^{-15}$ | $4.7 \times 10^{-12}$ | $7.5 \times 10^{-11}$ | $4 \times 10^{-11}$ | |
| 3 | Piperazine | Kerosene | $5 \times 10^{-16}$ | | $2.5 \times 10^{-13}$ | $1.2 \times 10^{-12}$ | $4.0 \times 10^{-12}$ |
| 4 | 4-chloro-butyronitrile | Regular Hydrofined JP-4 | $1.5 \times 10^{-14}$ | | $1.6 \times 10^{-13}$ | | $1.7 \times 10^{-12}$ |
| 5 | 3-chloro-propanol | Regular Hydrofined JP-4 | $1.5 \times 10^{-14}$ | | $2.0 \times 10^{-13}$ | | $1.2 \times 10^{-12}$ |
| 6 | 2-amino-ethanol | Regular Hydrofined JP-4 | $1.5 \times 10^{-14}$ | | $3.4 \times 10^{-14}$ | $1.4 \times 10^{-13}$ | $2 \times 10^{-13}$ |
| 7 | 1,5-Dicyanopentane | Regular Hydrofined JP-4 | $1.5 \times 10^{-14}$ | | $5 \times 10^{-14}$ | | $9 \times 10^{-14}$ |
| 8 | Ethylene formate | Regular Hydrofined JP-4 | $1.5 \times 10^{-14}$ | | | $9.6 \times 10^{-14}$ | $4.5 \times 10^{-13}$ |
| 9 | p-NO$_2$ phenyl isocyanate | Regular Hydrofined JP-4 | $1.5 \times 10^{-14}$ | | $4 \times 10^{-14}$ | | $5 \times 10^{-14}$ |

The data in the above table demonstrate the significant increase in the specific conductivity of combustible organic liquids which occurs as a result of the addition thereto of the bifunctional compounds of the present invention. The data further demonstrate that the presence of an OH group together with a cyano group is most beneficial. The presence of OH groups seems to be extremely beneficial since it also prevents haze formation in JP-4 by solubilizing small amounts of water. It will be noted that functional groups have to be judicially selected in order to bring about the desired increase in conductivity. The fact that not all bifunctional compounds are useful is illustrated by runs 7, 8 and 9.

Example 2

In order to demonstrate that monofunctional compounds containing amino or cyano groups have only a minor effect on the specific conductivity of combustible organic liquids, tests similar to Example 1 were run utilizing the compounds set out in Table II.

TABLE II.—EFFECT OF ADDITIVES UPON CONDUCTIVITY

| Run | Monofunctional Compound | Base Fuel | Specific Conductivity mho/cm.—Concentration, Wt. Percent | | | | |
|---|---|---|---|---|---|---|---|
| | | | 0 | 0.001 | 0.01 | 0.1 | 1.0 |
| 10 | n-Butylamine | Regular Hydrofined JP-4 | $1.5 \times 10^{-14}$ | | | | $3 \times 10^{-14}$ |
| 11 | Acetonitrile | Regular Hydrofined JP-4 | $1.5 \times 10^{-14}$ | | | | $1.8 \times 10^{-14}$ |
| 12 | Acrylonitrile | Regular Hydrofined JP-4 | $1.5 \times 10^{-14}$ | | | | $2 \times 10^{-14}$ |
| 13 | Nitro-ethane | Regular Hydrofined JP-4 | $1.5 \times 10^{-14}$ | | | | $1.5 \times 10^{-14}$ |

The data in the above table illustrate that monofunctional compounds even at high concentrations cause only very small improvements in the specific conductivity of JP-4 jet fuel.

What is claimed is:

1. A petroleum distillate fuel boiling in the range between about 75° F. and about 750° F. to which has been added from about 10 to about 800 parts per million of a bifunctional compound having one of the following formulae:

(1) 
$$X-(CH_2)_n-Z$$

(2) 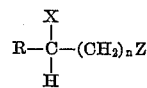
$$R-\underset{\underset{H}{|}}{\overset{\overset{X}{|}}{C}}-(CH_2)_nZ$$

wherein X is a functional member selected from the group consisting of cyano and hydroxy and Z is a functional member selected from the group consisting of cyano, hydroxy, chloro and bromo, X and Z being different, R is selected from the group consisting of alkyl of from 1 to 3 carbon atoms and $n$ is an integer of from 1 to 8 in Formula 1 and $n$ is an integer of from 0 to 7 in Formula 2.

2. A composition as defined by claim 1 wherein the petroleum distillate fuel is an aviation turbo-jet fuel.

3. A composition as defined by claim 1 wherein said bifunctional compound is present in a concentration of from 50 to 500 p.p.m.

4. A composition as defined by claim 1 wherein $n$ in Formula 1 is an integer from 2 to 5 and in Formula 2 is an integer from 0 to 3.

5. A composition as defined by claim 1 wherein said bifunctional compound is lactonitrile.

6. A composition as defined by claim 1 wherein said bifunctional compound is 4-chloro-butyronitrile.

7. A composition as defined by claim 1 wherein said bifunctional compound is 3-chloro-propanol.

References Cited

UNITED STATES PATENTS

| 1,989,528 | 1/1935 | Rather et al. | 44—72 |
| 2,021,088 | 12/1935 | Pevere | 44—72 |
| 2,274,665 | 3/1942 | Clarke | 44—72 |
| 2,730,464 | 1/1956 | Winsor | 252—8.8 |
| 2,887,368 | 5/1959 | Buckmann | 44—72 |

DANIEL E. WYMAN, *Primary Examiner.*

Y. H. SMITH, *Assistant Examiner.*